June 24, 1958 T. EVANS ET AL 2,839,980
CONSTRUCTION FOR SECTIONAL IMPLEMENTS
Filed Oct. 27, 1953 3 Sheets-Sheet 1

INVENTORS
THOMAS EVANS
ROBERT E. BEACH
REX CLEVELAND

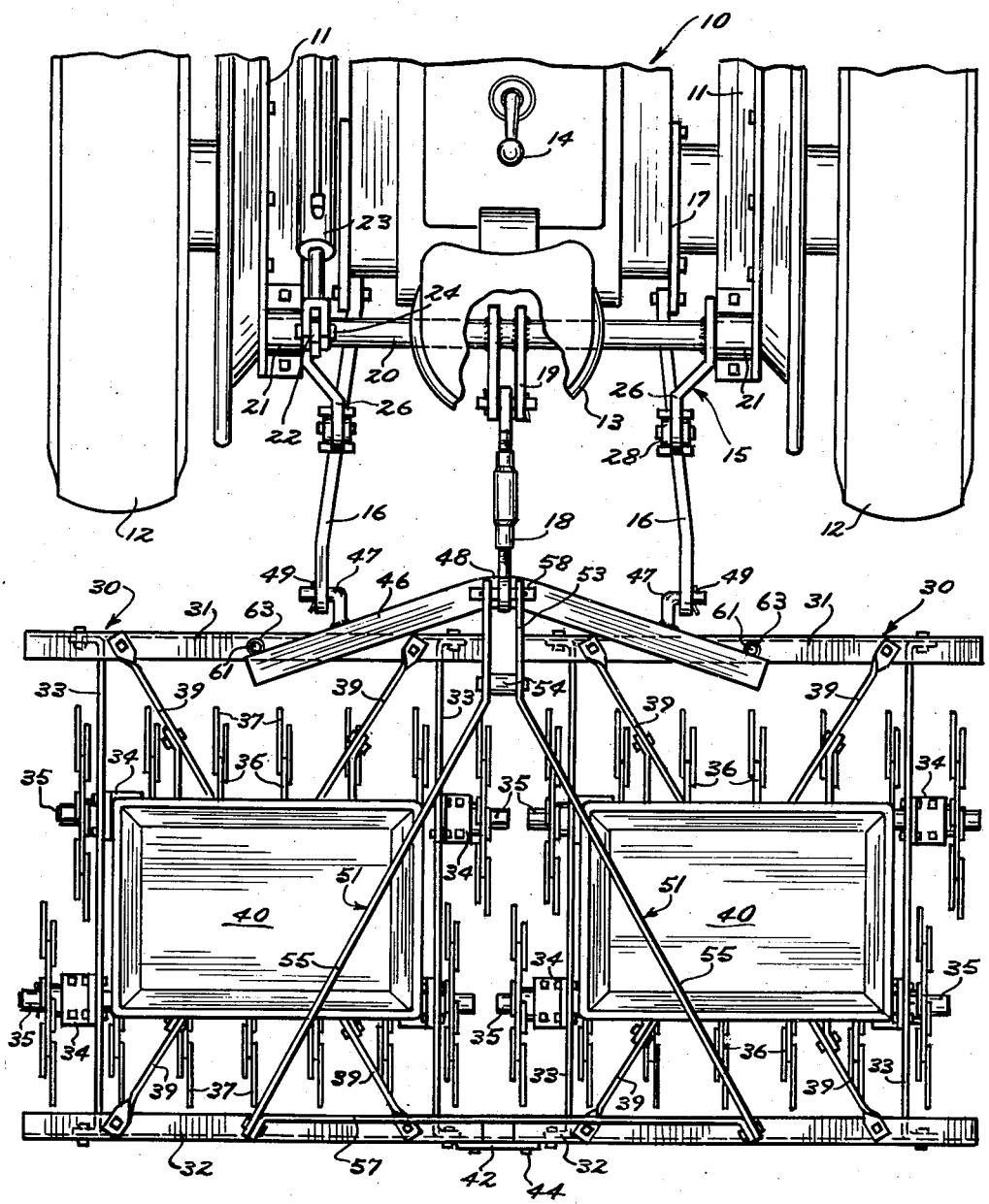

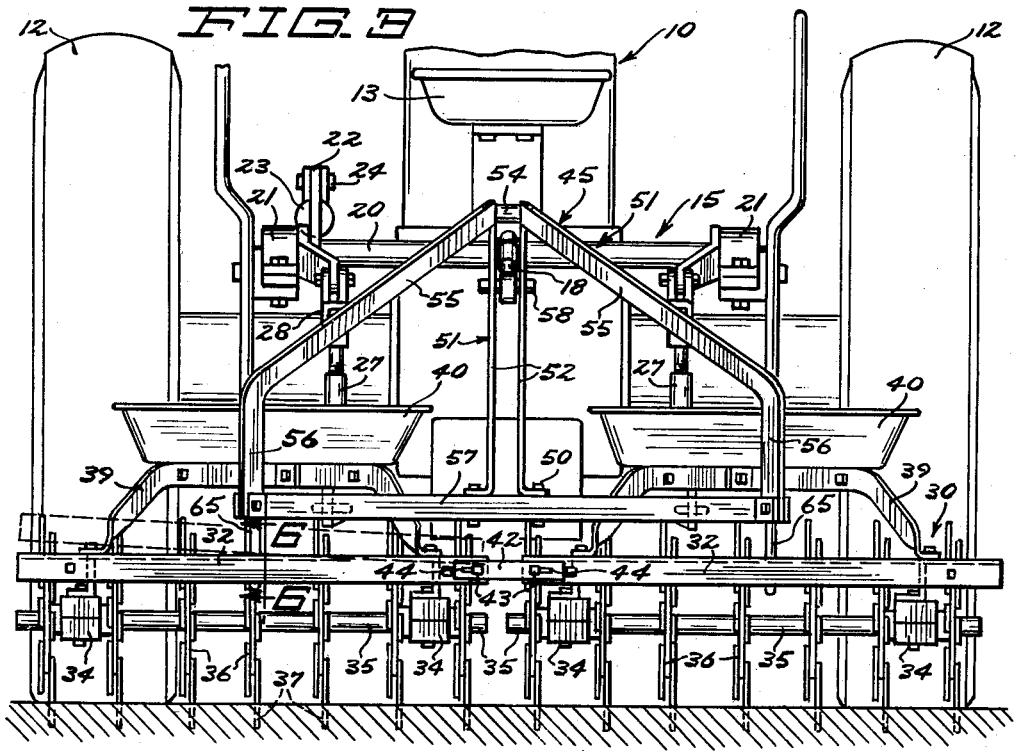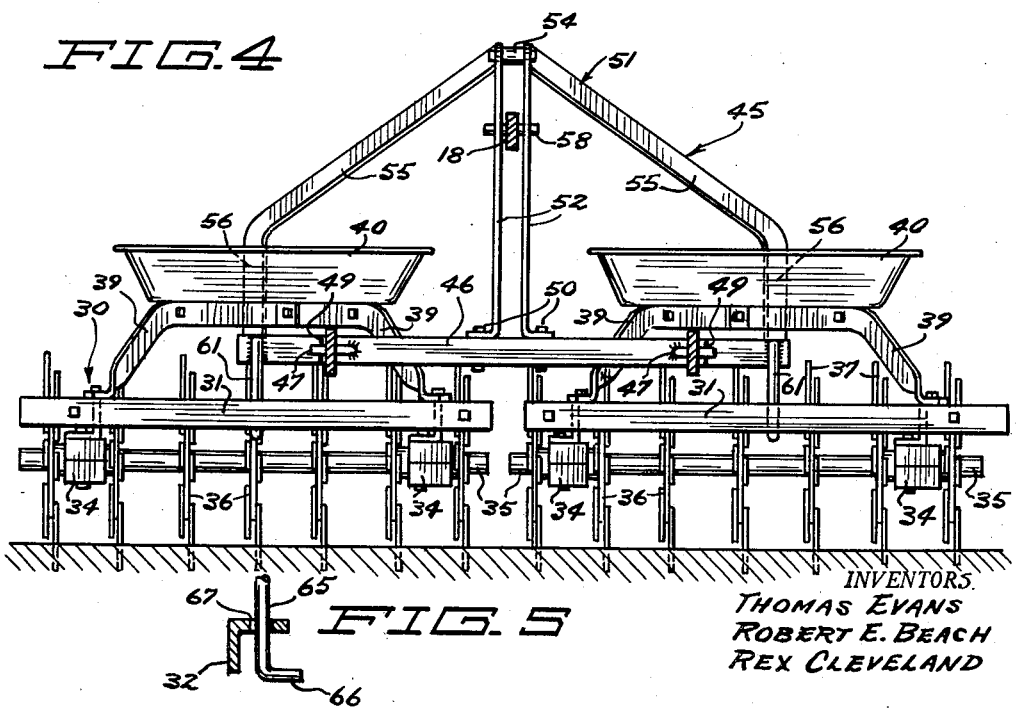

United States Patent Office 2,839,980
Patented June 24, 1958

2,839,980

CONSTRUCTION FOR SECTIONAL IMPLEMENTS

Thomas Evans and Rex Cleveland, Louisville, Ky., and Robert E. Beach, Greenville, Ind., assignors to Minneapolis-Moline Company, Hopkins, Minn., a corporation of Minnesota Application October 27, 1953, Serial No. 388,496

9 Claims. (Cl. 97—47.6)

This invention relates generally to agricultural ground working implements and more particularly to improvements in implement frames for effecting the connection between a traction device and a plurality of implement sections.

The primary object of our invention is to provide a sectional ground working implement with an improved hitching frame so as to allow the ground working sections freedom of independent tilting or raising and lowering movement with respect to each other and the implement draft vehicle.

Another object of the invention is to provide an improved implement frame for hitching a plurality of independent ground working gangs or sections to the power operated three-point hitch of a tractor to pull, raise and lower the same without producing compression forces within the implement.

Still another object of the invention is to provide a new and improved hitch frame for an agricultural implement having straight draft ground reactions which is loosely associated with the ground working tools of the implement allowing a free floating action thereof to conform with variable ground contours and yet which is adapted for rigid connection to the power operated rear hitch of a traction device for positively raising and lowering the tools relative to the ground.

With these and other objects in mind our invention broadly comprises a rigid main frame structure with means at the front end thereof for rigid connection of the frame to the draft links of a tractor three-point hitch with the frame extending rearwardly from the tractor, said frame having a plurality of forward and rearward laterally spaced suspension elements, and there being implement sections attached to the suspension elements for limited up and down and universal movement thereon but adapted to be raised and lowered with the frame as it is moved by operation of the hitch.

The above-mentioned and still additional objects of the invention will be brought to light during the course of the following specification, reference being made to the accompanying drawings, in which—

Fig. 2 is a plan view of the tractor and rotary hoe implement showing two hoe wheel sections.

Fig. 3 is a rear elevation of the device with the rear bar of one of the hoe sections shown in raised position, in broken lines, relative to the other section.

Fig. 4 is a front elevation of the implement with the hoe wheels in ground working position.

Fig. 5 is an enlarged detail section taken on line 5—5 of Fig. 3 showing the slidable engagement between one of the suspension elements and the implement section it carries.

Figure 1:
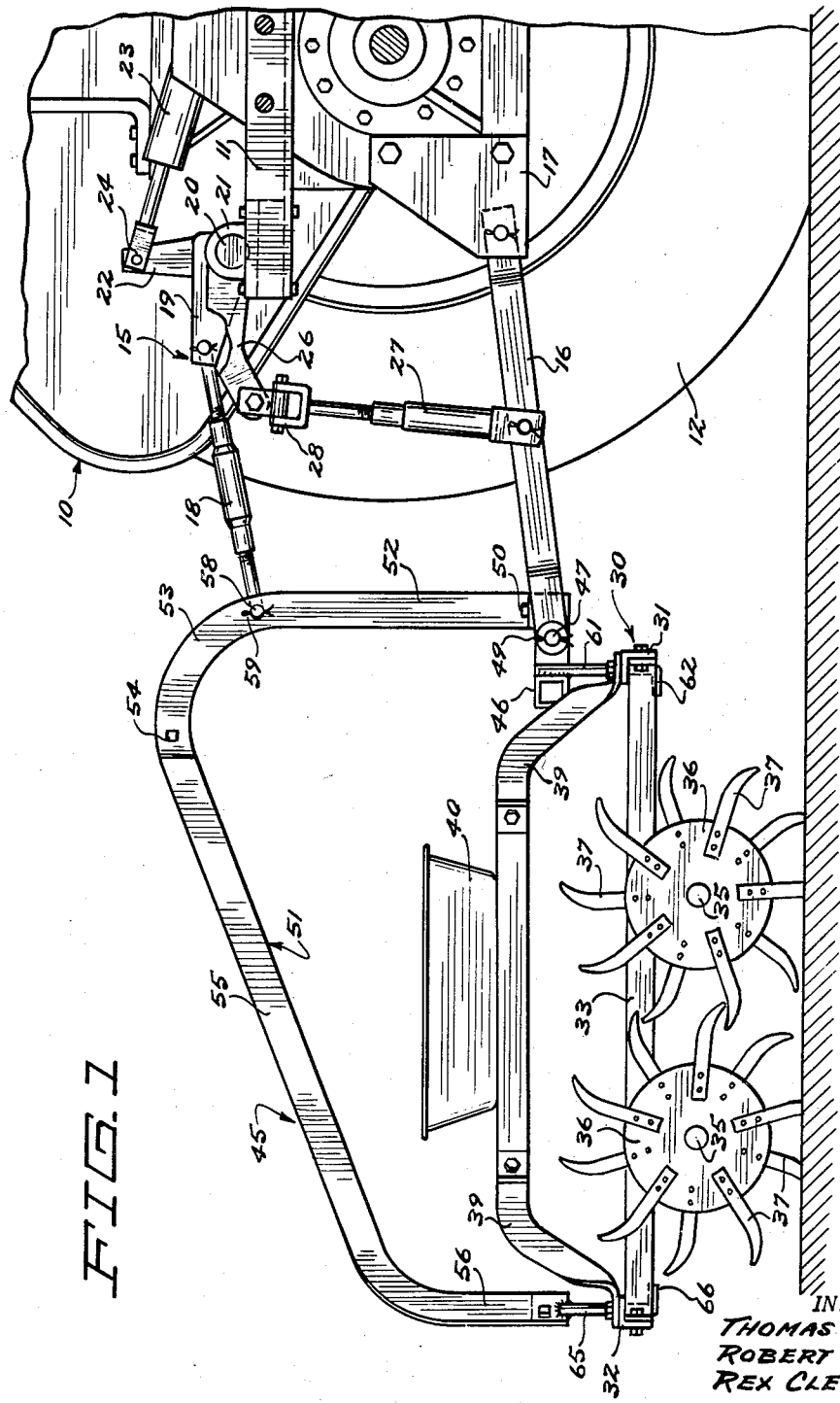
Fig. 1 is a side elevation of our invention embodied in a sectional rotary hoe, the implement being shown in operative draft connection with a tractor having a three-point hitch.

Referring now more particularly to the drawings reference numerals will be used to denote like parts and structural features in the different figures. The numeral 10 indicates generally a tractor, only the rear end of which is shown, having a forwardly extending frame 11, rear traction wheels 12, operator's seat 13, and manual hydraulic control 14. The tractor is equipped with a hydraulically operated three-point draft hitch, denoted generally at 15. This hitch has a pair of transversely spaced lower hitch links 16 pivoted at their forward ends to brackets 17 mounted on the tractor 10 and an upper center link 18 pivoted at its forward end to rocker arm 19 fixed on the lifting roll 20, the roll being journaled as in bearing brackets 21 on the frame 11 for oscillating movement about a transverse axis. A lifting arm 22 is fixed to one end of the shaft or lifting roll 20 and this arm is connected to a forward point on the tractor by the hydraulic jack 23. The piston rod of jack 23 is pivoted, as at 24, to the arm 22 and the cylinder thereof is pivoted to the tractor at said forward point. Control 14 is for operating the jack 23 to selectively extend or retract the same for respective rearward or forward movement of the arm 22 to oscillate roll 20 about its axis.

A pair of lifting arms 26 are fixed to the roll 22 and extend rearwardly over the lower links 16. The swinging end of each arm 26 is connected to a central point on the adjacent link 16 as by a lifting link 27 having a universal joint at 28. It will accordingly be understood that as jack 23 is operated to move arm 22 forwardly, arms 19 and 26 will be swung upwardly about the axis of shaft 20 to swing links 16 upwardly about their connections with brackets 17 and to exert a longitudinal pulling force on the link 18. The various links 18 and 27 are length adjustable by means of their threaded multiple-piece construction.

While we have shown one form of three-point hitch construction, it will shortly be understood that this hitch alone forms no part of our invention and that our improved implement hitching frame may be used with any one of the many heretofore known hitches having an upper center link and a pair of transversely spaced lower links.

In disclosing our invention we have shown it used to operatively support a pair of rotary hoe gangs from the tractor hitch 15. These gangs are structurally independent and are each denoted generally at 30. Each gang has a frame consisting of a front bar 31 and a rear bar 32 of angle iron which are rigidly connected in longitudinally spaced parallel relation by transversely spaced side bars 33. These side bars carry suitable bearing means 34 to support for rotation one or more axle shafts 35 each of which has mounted thereon a plurality of hoe wheels 36 having radial tines 37 adapted to work the ground in the usual manner.

Each gang has a pair of additional frame members 39 which arch from the front bar 31 to the rear bar 32 and are arranged in crossed relation which serve to strengthen the frame and also to support the weight pan 40. These pans 40 on each gang are designed to carry dirt or other weighty material to assure ground penetration by the hoe tines 37.

We have shown two hoe gangs 30 and as previously stated these gangs are structurally independent of each other. The two gangs are arranged in side by side position behind the tractor with their respective front and rear hoe wheel shafts 35 in transverse alignment (Fig. 2). The inner or adjacent ends of the rear bars 32 of the two gangs are flexibly connected by a strap 42. This strap has longitudinally extending slots 43 (Fig. 3) which receive bolts 44 fixed one to each bar 32. With this flexible type of connection each of the gangs is allowed limited lateral tilting movement with respect to the other.

The implement main or hitch frame is designated generally at 45 and its means of association with the hitch 15 and hoe gangs 30 will now be described in detail. A heavy cross beam 46 (Fig. 2) has a pair of transversely spaced horns 47 each extending forwardly, then outwardly as shown for journaling as at 48 in the extended end of the adjacent link 16. Beam 46 is slightly longer than the distance between links 16 and is angled, as at 48, to extend outwardly and slightly rearwardly from its center as shown in Fig. 2. Horns 47 are round in cross section and the outwardly extending portions thereof are in transverse alignment whereby they jointly form a transverse turning axis for the beam. Cotter pins 49 may be used to hold the links 16 on the horns 47.

At the center portion of beam 46 there are rigidly secured, as by bolts 50, the forward ends of two bail members denoted generally at 51. The bail members have forward upright portions 52 lying only slightly to one side of and one on each side of the center of the beam. Each of the bails then curves rearwardly, as at 53, on the longitudinal vertical plane of its portion 52 where it is connected to the other bail by bolt 54 and then angles downwardly and outwardly in its rearward extension, as at 55, terminating in a rear upright portion 56 disposed above the bar 32. Accordingly the portions 52 and 53 of the two bails lie on parallel, transversely spaced longitudinal vertical planes on opposite sides of the center of bar 46 and equally spaced therefrom. They then diverge in their rearward extension as may best be observed in Fig. 2. The two members are rigidly united at their rear ends by means of a cross member or rear bar 57.

The hitch frame is adapted for connection to the rear end of upper hitch link 18 by the provision of a pair of aligned apertures in the bail members substantially at the point of junction of the portions 52 and 53. The extended end of link 18 is provided with an eye and this eye is secured between the members 51 by means of a pivot pin 58 secured against endwise removal by cotter pins 59.

The connection between the main frame and gangs 30 will now be described, with particular reference to Figs. 3 and 4. Cross beam 46 (Fig. 4) is provided adjacent each end with a downwardly projecting suspension element or lifting rod 61 having a straight vertically disposed shank and terminal 62 bent rearwardly at a right angle to the shank. Each member 61 extends downwardly through an aligned aperture 63 in the top horizontal flange of the angle iron front bar 31 of the adjacent gang 30. Each aperture 63 has a diameter sufficiently greater than that of rod 61 as to allow the bar 32 to move freely up and down on the shank and even limited lateral tilting movement. Terminal portion 62, however, prevents upward withdrawal of the hook from the front bar.

Similarly at its rear end and fixed to the lower end of each bail portion 56 substantially at its point of connection with bar 57 the frame is provided with depending suspension members 65 having vertical shanks and forwardly bent terminals 66. Here the hook shanks 65 extend through apertures 67 in the rear gang bars 32, such apertures being of sufficient size as to allow up and down and tilting movement of the gangs.

It will now be understood that when the hitch frame is attached to the tractor hitch links 16 and 18 in the manner described it becomes rigidly associated with the tractor while the independent hoe gangs 30 which it carries are allowed a certain degree of vertical flexibility with respect to the frame. This flexibility is significant in working uneven ground as working contact by both gangs is assured regardless of the lateral contour of the land.

As heretofore mentioned, the elevation of the rear ends of links 16 is controlled by jack 23 through lifting roll 20. In operation of our improved implement frame with the three-point hitch the elevation of links 16 and the length of tension link 18 should be properly adjusted to support frame 45 in such a position that gangs 30 will ride substantially midway on the rods 61 and 65 when the hoe wheels 36 are in ground working position in level ground (Fig. 6). Gangs 30 are then more or less in a floating condition being free to rock fore and aft, roll sidewardly, or raise or lower in their entirety relative to the frame. The desired adjustment can be made by length adjustment of links 18 and 27 or rotary adjustment of the lifting roll 20.

When it is desired to lift the implement to a transport position manual control 14 is manipulated to retract the jack 23 and pull arm 22 forwardly rotating roll 20 clockwise (as viewed in Fig. 1). Integral arms 26 and 19 are then swung upwardly respectively raising links 16 about their forward pivots and creating an upward forward pull on link 18. With this action bar 46 is raised until hook portions 62 engage against the underside of bars 30 and link 18 pulls the frame forwardly and upwardly about pivot point 47 for engagement of hook portions 66 against the underside of rear gang bars 32. The frame 45 is then in fore and aft lifting engagement with each of the gangs and the gangs are carried upward to a raised or transport position with the frame.

While we have herein shown and described our invention in use with a pair of implement sections, it will be understood that the frame can also be constructed in such a manner as to hitch more than two implement sections to the tractor.

We also desire to make it clear that the disclosure of the invention in connection with rotary hoe gangs is merely illustrative and that the frame can be used with like effectiveness on other sectional ground working implements, particularly those having straight draft ground reactions such as peg tooth and spring tooth harrows, soil pulverizers, packers, rod weeders, and the like.

Of primary importance in the invention is the floating action allowed the implement sections. Each gang is allowed freedom to raise and lower or tilt laterally, forwardly, or rearwardly independent of the hitch frame. This is due to the inherent rigidity of the frame, its fixed relation to the draft implement, and the looseness of the connections at the implement suspension points allowing the sections limited vertical sliding and universal action on the suspension hooks. The rigidity of the frame is also important in that it eliminates the setting up of compression forces in the implement such as occur where a tension tie member connects the upper hitch link to the implement.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. A straight draft ground working implement comprising a main draft frame adapted to be rigidly carried on a traction device to extend rearwardly therefrom, a plurality of auxiliary frames, means mounting the auxiliary frames on said main frame in transverse alignment with respect to the longitudinal direction of draft, ground working tools on each auxiliary frame imposing a ground draft parallel to said direction of draft, said auxiliary frame mounting means effected by each auxiliary frame having vertically directed openings located fore and aft of the ground working tools thereon, fore and aft suspension rods rigid with the main frame extending vertically through said openings allowing free up and down floating movement of each auxiliary frame with respect to the main frame while restraining the auxiliary frame against side to side movement, said openings being considerably larger in diameter than said rods allowing the auxiliary frame limited relative universal movement, 2. A straight draft ground working implement comprising a main draft frame adapted to be rigidly carried on a traction device to extend rearwardly therefrom, a plurality of auxiliary frames, means mounting the auxiliary frames on said main frame in transverse alignment with respect to the longitudinal direction of draft, ground working tools on each auxiliary frame imposing a ground draft parallel to said direction of draft, said auxiliary frame mounting means effected by each auxiliary frame having vertically directed openings located fore and aft of the ground working tools thereon, fore and aft, suspension rods rigid with the main frame extending vertically through said openings allowing free up and down floating movement of each auxiliary frame with respect to the main frame while restraining the auxiliary frame against side to side movement, said openings being considerably greater in transverse width than said rods allowing limited lateral tilting of the auxiliary frames with respect to the main frame.

3. An improved ground working implement comprising a main frame adapted to be rigidly carried on a traction device, said frame having a plurality of pairs of downwardly and rigidly extending elongated carrying members, the members of each said pair being in longitudinal alignment with one another with respect to the direction of draft, a plurality of auxiliary frames each slidably mounted on an individual pair of carrying members in such a manner as to permit the auxiliary frames to freely raise and lower along the members on a restricted path with respect to the main frame, and a series of ground working tools mounted on each of said auxiliary frames.

4. An implement hitch frame for use with an implement having power lifted trailing draft links, said frame having front and rear ends, means at the front end of the frame for connecting the frame to said links to be power raised and lowered thereby, laterally spaced implement suspension means on both the front and rear ends of the frame, each of said suspension means comprising an elongated lifting rod fixed to the frame to extend vertically downward therefrom to receive the implement for vertical sliding thereon, and said rod having stop means at its lower end for engaging the implement in such a manner that the implement is lifted with the frame when it is power raised by the links.

5. An implement hitch frame for use with a tractor having an upper and a pair of lower trailing draft links which comprises a front beam, a rear bar, connecting means between said bar and beam holding them in relatively rigid substantially parallel position, the front beam having means for attachment to said lower links to support the beam and bar in longitudinally spaced relation behind the tractor, said connecting means comprising a pair of rigid bail members having their forward ends rigidly connected to the beam intermediate said attachment means and their rear ends rigidly connected to the bar and said bails each arching between its ends, the bail portions adjacent said forward ends being transversely closely spaced and parallel for the reception therebetween of and connection to the tractor upper link, the bails relatively diverging in their rearward arching extension from said bail portions to the rear bar, the rear ends of the bails and the rear bar jointly forming a frame rear end, a plurality of pairs of implement carrying members on the frame for attachment of implement sections to the frame, said members in each pair being one on the beam and the other on said rear end and in longitudinal alignment with each other and each of said carrying members comprising an elongated slide rod integrally mounted in vertically depending position on the frame for free vertical sliding of the implement section therealong, and having stop means at its lower end spaced substantially below said integral mounting for retaining such section on the rod.

6. A hitch frame for mounting a pair of implement gangs in side by side relation at the rear of a tractor having a pair of laterally spaced power lifted trailing draft links and a central top link, each of said gangs having a gang frame including front and rear cross bars, said hitch frame comprising an elongated front beam, means on the beam for attachment thereof to the draft links to extend transversely at the rear of the tractor, a pair of bail members attached to the beam near the center thereof and extending upwardly from the beam in transversely spaced relation for reception therebetween of the top link, means for connecting the top link to the bails at an elevation substantially above said beam, said bails extending rearwardly from said last mentioned connection and diverging in their rearward extension, a bracing member rigidly connecting the bail members rearward of said connection to secure them in their relative divergent condition, and a plurality of lifting elements depending from the frame and engageable one with each of said bars for lifting the gangs with the frame, each said lifting element comprising a vertically elongated member which is slidably associated with the bar.

7. An implement for use with a tractor having a pair of laterally spaced power lifted trailing draft links and a central top link which comprises a pair of independent group working gangs arranged in side by side relation, each gang having a rigid frame including front and rear cross bars, each of said bars having a vertically directed aperture located substantially at the longitudinal center thereof, a hitch frame, means on the hitch frame for mounting the frame rigidly on the tractor to extend rearwardly over the gangs, and said frame having four depending lift rods aligned one with each of said apertures and extending downwardly therethrough, each of said rods having an enlargement at its lower end preventing its upward withdrawal through the aperture.

8. An implement hitch frame for use with a tractor having a pair of laterally spaced, power lifted, trailing draft links and a central top link which comprises an elongated front beam, means on the beam for attachment thereof to the draft links to extend transversely at the rear of the tractor, a frame structure having one end rigidly fixed to the center of the beam and extending upwardly therefrom for connection to the top link, said structure extending rearwardly from the top link connection and having two structural members which relatively diverge in their rearward extension, a cross bar rigidly connecting the rearmost ends of said arms to jointly therewith form a frame rear end which is rigid with and extends generally parallel to said beam, and said beam and said rear end each having a pair of integral, laterally spaced depending suspension rods, a pair of implement sections disposed side by side under the frame each having front and rear cross bars respectively disposed in transverse alignment, said bars each having an aperture for receiving a suspension rod whereby the bar is vertically slidable thereon, and said apertures being substantially greater in diameter than the rods to allow the bars to tilt sidewardly and forwardly thereon.

9. A straight draft ground working implement comprising a main draft frame adapted to be rigidly carried on a traction device to extend rearwardly therefrom, a plurality of independent group work gangs arranged in side by side relation under said draft frame, each gang having a rigid gang frame with a plurality of ground working tools mounted thereon, each gang frame having two longitudinally spaced and substantially aligned connections with the draft frame, each connection comprising one of said frames having a vertically directed opening, and a vertical suspension bar mounted on the other frame extending through said opening for vertical sliding movement of the gang frame relative to the draft frame, and said opening being substantially larger in cross section than said bar to allow limited universal movement between the frames at each connection.

References Cited in the file of this patent

UNITED STATES PATENTS

| | | | |
|---|---|---|---|
| 578,202 | Bramer | Mar. 2, | 1897 |
| 2,336,152 | Rude | Dec. 7, | 1943 |
| 2,363,749 | Rude | Nov. 28, | 1944 |
| 2,617,342 | Meissner | Nov. 11, | 1952 |
| 2,617,343 | Warne | Nov. 11, | 1952 |
| 2,694,279 | Nelson et al. | Nov. 16, | 1954 |

FOREIGN PATENTS

| | | | |
|---|---|---|---|
| 554,033 | Great Britain | June 16, | 1943 |